United States Patent
Kollmann et al.

(12)
(10) Patent No.: US 6,172,150 B1
(45) Date of Patent: *Jan. 9, 2001

(54) ROOM-TEMPERATURE VULCANIZING CONDENSATION-CROSSLINKING SILICONE RUBBERS

(75) Inventors: Georg Kollmann, Burghausen; Hans-Rudolf Pfeffer; Eva-Maria Puppe, both of Emmerting, all of (DE)

(73) Assignee: Wacker-Chemie GmbH, Munich (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/789,929

(22) Filed: Jan. 28, 1997

(30) Foreign Application Priority Data

Feb. 1, 1996 (DE) .............................. 196 03 628

(51) Int. Cl.⁷ .............................. C08K 5/00; C08L 83/04
(52) U.S. Cl. .................. 524/379; 524/413; 524/414; 524/428; 524/858; 524/860
(58) Field of Search ................... 524/176, 236, 524/379, 413, 414, 428, 858, 860; 525/474

(56) References Cited

U.S. PATENT DOCUMENTS

| | | |
|---|---|---|
| 2,953,543 | 9/1960 | Pike . |
| 4,849,388 * | 7/1989 | Millet .................. 502/102 |
| 4,879,339 | 11/1989 | Yoshino . |
| 5,118,735 | 6/1992 | Burnier . |
| 5,380,478 | 1/1995 | East . |
| 5,814,695 * | 9/1999 | Fitzgerald et al. .......... 524/731 |

FOREIGN PATENT DOCUMENTS

| | | |
|---|---|---|
| 620955 | 6/1990 | (AU) . |
| 0404325 | 12/1990 | (EP) . |
| 568153 | 3/1994 | (EP) . |
| 1518135 | 7/1978 | (GB) . |
| 2032936 | 5/1980 | (GB) . |
| 8603120 | 6/1986 | (WO) . |

OTHER PUBLICATIONS

Noll, W. Chemistry And Technology of Silicones 2nd Edition 1968 p. 395–399.

Handbach der Tribologieund Schmierungstechnik, W.T. Barz "Additive für Schmierstoff", Bol 2, Vincentz Verlag, 1984.

Fitzgerald, specification of USSN 08/525,253, filed Sep. 8, 1995.*

Database WPI, Section Ch, Week 9629, Derwent Publications Ltd. AN 96–285478.

Patent Abstracts of Japan, vol. 013, No. 124 (C–580), Mar. 1989 & JP 63295646, Dec. 2, 1988.

* cited by examiner

*Primary Examiner*—Jeffrey C. Mullis
(74) *Attorney, Agent, or Firm*—Brooks & Kushman P.C.

(57) ABSTRACT

Condensation-crosslinking, room-temperature vulcanizing silicone rubber compositions A which contain additives B selected from the group consisting of sterically hindered phenols, sterically hindered bisphenols, sterically hindered thiobisphenols, zinc dialkyl dithiophosphates, zinc diaryl dithiophosphates, aromatic amines, sterically hindered amines or preparations containing the abovementioned substances, these additives optionally being present in the compositions A either individually or in any mixtures and mixing ratios with respect to one another.

14 Claims, No Drawings

ROOM-TEMPERATURE VULCANIZING CONDENSATION-CROSSLINKING SILICONE RUBBERS

BACKGROUND OF THE INVENTION

The use of two-component silicone rubbers which vulcanize at room temperature as a material for making flexible female molds is known (see, W. Noll, Chemie und Technologie der Silicone [Chemistry and technology of silicones], Verlag Chemie, Weinheim, 2nd edition 1964, pp. 339–340). With the aid of such molds, even models having highly complex surface structures can be reproduced and duplicated using various materials. In addition to the high flexibility and mechanical strength, which enable demolding by vigorous stretching or even by glove-like turning inside out, the easy workability and high accuracy of reproduction in conjunction with the strongly adhesive effect to most of the currently used reproduction materials form the basis for the leading position of the RTV-2 silicone rubbers as mold materials in the industrial and artistic field of duplicating objects.

One of the most important and most frequently utilized fields of application for flexible female molds made of RTV-2 silicone rubber is the manufacture of small series of moldings from organic resins, in particular unsaturated polyester and polyurethane resins. Small series of moldings are required where, the existence of numerous different designs, each requires only relatively low production runs, so that it becomes uneconomic for molds for casting or injection molding to be made from e.g. metal, because of their high costs, e.g. in the manufacture of prototypes, bathroom and kitchen furniture panels, period furniture, picture frames and mirror frames, promotional material, souvenirs and the like. Keeping the unit costs as low as possible requires the highest possible molding frequency, i.e. number of reproductions per mold.

Unfortunately, flexible molds made of RTV-2 silicone rubber have a limited service life. Apart from purely mechanical damage caused by the demolding procedure, physical and chemical effects will give rise, depending on the degree to which the mold surface is structured, on the type and composition of the reproduction material and on the number of casts made per day, to an increasing loss in release properties. This manifests itself by an increasing force required for demolding, until finally the casting may partially adhere to the mold, so that demolding is no longer possible without damaging the mold surface. The mold has reached the end of its service life.

In unsaturated polyester resins containing styrene, the styrene penetrates the boundary layer of the rubber mold and partially polymerizes within the silicone rubber matrix to give polystyrene, with the formation of an interpenetrating network of polydimethylsiloxane and polystyrene, so that the proportion of polydimethylsiloxane per unit volume decreases. This results in embrittlement and in a reduction of the release properties of the mold surface. The mold fails either as a result of mechanical damage, since the embrittled areas of the mold are no longer sufficiently flexible for the mold to be stretched during demolding of the resin castings, or alternatively as a result of adherence of a casting to a larger or smaller area, owing to by now inadequate release properties of the mold surface.

In contact with polyurethane resins the silicone rubber will be chemically attacked by the isocyanate component, i.e. the NCO will react with SiOH functions still present, e.g. from the hydrolysis of excess crosslinker, to form copolymer structures, as a result of which the surface of the mold similarly successively loses its release properties with respect to the casting resin, until adherence of a casting results.

The higher the reaction temperature of the casting resin, and the longer the rubber mold is subjected thereto, the heavier it will suffer from chemical attack, i.e. the lower will be the number of casting per mold.

There have been no attempts to extend the service life of flexible molds made of RTV-2 silicone rubber, by applying an additional release agent layer which has the effect of repelling the organic resin. Such external release agents based on waxes, low- and high-molecular weight silicone oils or silicone resins, or perfluorinated hydrocarbons are known (e.g. Beck and Smith, EP 404325, and East, U.S. Pat. No. 5,380,478), and some of them are available from specialized manufacturers such as, e.g., Würtz, Acmos and Arti. They have distinct drawbacks however, since they can be used only as solvent-containing preparations in a thin layer and virtually all of the solvents suitable for this purpose caused marked swelling of the vulcanized silicone rubber. It is necessary to wait after application of the above release agents, until the solvent has completely volatilized from the vulcanized rubber, since molds which still contain solvent suffer noticeable deterioration in terms of their stability with respect to organic resins. Another disadvantage is that these release agents must, as a rule, be freshly applied after each demolding operation, since they are partially carried away with the casting and this, in turn, may have an adverse effect on the paintability of the latter. Furthermore, the release agent tends to accumulate in poorly accessible corners and under cuts resulting in decreased reproduction accuracy. The additional work required further increases the unit costs.

Attempts have been made to avoid the drawbacks of external release agents by using internal releasing agents. Such release agents, e.g. higher-molecular weight silicone oils or hydrocarbons, exhibit a certain incompatibility with the vulcanized silicone rubber and therefore migrate to the mold surface, where they form an external release agent film. While they do not have the drawback of requiring repeated application and of containing solvents which cause swelling, they do suffer from the other abovementioned drawbacks of external release agents.

Since the attack on the silicone rubber surface, whether it be physical or chemical, is usually associated with a swelling process of the vulcanized material, attempts were further made to increase the resistance to casting resin by optimized formulations of the silicone rubber molding compositions in terms of polymer/crosslinker content, filler type and filler content, and catalyst type and catalyst content (e.g. Smith, EP 586153; Frances, EP 378952; Gibard, EP 010478).

While all the methods mentioned are able to improve, to a certain extent, the resistance of molds made of RTV-2 silicone rubber with respect to organic resins, they are unsatisfactory with regard to the degree of the improvement and owing to drawbacks with regard to processing effort, reproduction accuracy or further processing of the resin moldings produced.

BRIEF SUMMARY OF THE INVENTION

The present invention relates to condensation-crosslinking, room-temperature vulcanizing silicone rubber compositions, to a method for preparing them, to their use and to female molds.

DETAILED DESCRIPTION OF THE INVENTION

It is an object of the present invention to provide female molds which are improved with respect to their service life with respect to organic resins, preferably unsaturated polyester and polyurethane resins, and which are made from condensation-crosslinking, room-temperature vulcanizing silicone rubber compositions.

The present invention relates to condensation-crosslinking, room-temperature vulcanizing silicone rubber compositions A which contain an additive B selected from the group consisting of sterically hindered phenols, sterically hindered bisphenols, sterically hindered thiobisphenols, zinc dialkyl dithiophosphates, zinc diaryl dithiophosphates, aromatic amines, sterically hindered amines or preparations containing the abovementioned substances, these additives optionally being present in the compositions A either individually or in mixtures and mixing ratios with respect to one another.

The condensation-crosslinking, room-temperature vulcanizing silicone rubber composition A may comprise any condensation-crosslinking, room-temperature vulcanizing silicone rubber composition, a preferred composition comprising;

a) an α,ω-dihydroxypolydiorganosiloxane of the formula

HO—[R$_2$SiO]$_n$—H wherein n is >10, preferably 50–2000, and more preferably 100–1000, and R is an optionally halogenated organic radical, b) crosslinkers, comprising, (i) silanes of the formula $R^1_a Si(OR^2)_{4-a}$ wherein a is equal to 0 or 1, $R^1$ is an optionally halogenated univalent hydrocarbon radical having 1–8 carbon atoms and $R^2$ is a univalent hydrocarbon radical having 1–4 carbon atoms and/or (ii) partially hydrolyzed products of silanes as listed under (i), wherein, a is 0 or 1, consisting of units selected from the group consisting of the units of the formulae (R$^2$O)$_3$SiO$_{0.5}$, (R$^2$O)$_2$SiO, (R$^2$O)SiO$_{1.5}$ and SiO$_2$ wherein $R^2$ has the meaning specified under (i), c) catalysts, comprising;

k) organotin compounds of the formula

R'$_2$Sn(OCOR")$_2$ in which

R' is a univalent hydrocarbon radical having 1–16 carbon atoms and

R" is a hydrocarbon radical having 1–19 carbon atoms, amd/or (kk) Reaction mixtures of arganotin compounds listed under (k) with silanes listed under (i) or partially hydrolyzed products of silanes, listed under (ii).

In a) preference is given to linear polymers comprising more than 10 diorganosiloxane units which, at the two chain ends have a silanol group (—SiOH), in which the radicals R may be identical or different univalent hydrocarbon radicals having 1–18 carbon atoms.

Examples of R are methyl, ethyl, phenyl, vinyl or 3,3,3-trifluoropropyl radicals, preferably methyl, vinyl or phenyl radicals, more preferably methyl radicals, with a preferred viscosity of the α,ω-dihydroxypolydiorganosiloxanes between 100 mPa.s and 500000 mPa.s at 23° C., more preferably between 500 mPa.s and 80000 mPa.s at 23° C.

Examples of $R^1$ are alkyl radicals such as methyl, ethyl, propyl, butyl, pentyl, hexyl or octyl radicals, alkenyl radicals such as vinyl or allyl radicals, aryl radicals such as phenyl radicals, aralkyl radicals such a benzyl radicals, alkaryl radicals such as tolyl or xylyl radicals, halogenated hydrocarbon radicals such as chloromethyl or 3,3,3-trifluoropropyl radicals, but preferably methyl, ethyl, n-propyl, isopropyl or n-butyl radicals.

Preferred examples of $R^2$ are methyl, ethyl, n-propyl, isopropyl and n-butyl radicals.

Examples of monomeric silanes of the formula $R^1_a Si(OR^2)_{4-a}$ useful as crosslinker (i), are methyltrimethoxysilane, chloromethyltrimethoxysilane, ethyltrimethoxysilane, propyltrimethoxysilane, vinyltrimethoxysilane, methyl-triethoxysilane, vinyltriethoxysilane, phenyltriethoxysilane, methyltripropoxysilane, phenyltripropoxysilane, tetramethoxysilane, tetraethoxysilane, tetra-n-propoxysilane, tetra-n-butoxysilane.

Examples of oligosiloxanes of (ii), which are often described in terms of their SiO$_2$ content in wt %, are hexamethoxydisiloxane, hexaethoxydisiloxane, hexa-n-propoxydisiloxane, hexa-n-butoxydisiloxane, octaethoxytrisiloxane, octa-n-butoxytrisiloxane and decaethoxytetrasiloxane, preferably heaxethoxydisiloxane, hexa-n-propoxydisiloxane and decaethoxytetrasiloxane.

The crosslinkers (A) (b) (i) and (A) (b) (ii) are used in a quantitative proportion of 0.5–10 wt %, preferably 1–5 wt %, in the preparations.

Examples of R' are methyl, ethyl, n-propyl, isopropyl, n-butyl, n-octyl, n-decyl, n-dodecyl, n-hexadecyl, particularly preferably methyl, n-butyl, n-octyl.

Examples of R" are alkyl radicals such as methyl, 2-ethylpentyl, n-heptyl, n-octyl, 2,2-dimethylheptyl, n-nonyl, n-undecyl, n-tridecyl, n-pentadecyl, n-heptadecyl, n-nonadecyl and unsaturated hydrocarbon radicals such as C$_9$H$_{19}$OOC—CH=CH—, CH$_3$—(CH$_2$)$_7$—CH=CH—(CH$_2$)$_7$—, preferably methyl, 2-ethylpentyl, 2,2-dimethylheptyl, n-undecyl, n-heptadecyl, C$_9$H$_{19}$OOC—CH=CH—, CH$_3$—(CH$_2$)$_7$—CH=CH—(CH$_2$)$_7$—.

Preferred examples of the organotin compounds, mentioned under (k), of the formula R'$_2$Sn(OCOR")$_2$ are dimethyltin di-2-ethylhexoate, dimethyltin dilaurate, di-n-butyltin diacetate, di-n-butyltin di-2-ethylhexoate, di-n-butyltin dicaprylate, di-n-butyltin di-2,2-dimethyloctoate (di-n-butyltin versatate®), di-n-butyltin dilaurate, di-n-butyltin distearate, di-n-butyltin dimaleate, di-n-butyltin dioleate, di-n-butyltin diacetate, di-n-octyltin di-2-ethylhexoate, di-n-octyltin di-2,2-dimethyloctoate (di-n-octyltin versatate®), di-n-octyltin dimaleate and di-n-octyltin dilaurate, more preferably di-n-butyltin di-2-ethylhexoate, di-n-butyltin dicaprylate, di-n-butyltin di-2,2-dimethyloctoate (di-n-butyltin versatate®), di-n-butyltin dilaurate, di-n-octyltin di-2-ethyl-hexoate, di-n-octyltin dimaleate and di-n-octyltin dilaurate.

The reaction mixtures listed as catalysts under (A) (c) (kk), of organotin compounds lister under (A) (c) (k) with silanes listed under (A) (c) (i) or of partially hydrolyzed products, listed under (A) (c) (ii), of silanes (e.g. Hechtl, EP 50358) are mixtures of reaction products of the silanes listed under (A) (c) (i) or of partially hydrolyzed products, listed under (A) (c) (ii) of silanes with the organotin compounds listed under (A) (c) (k). The reaction can take place at room temperature, but preferably at temperatures around the boiling point of the silicic ester. The alkyl carboxylate formed in the reaction may remain in the reaction mixture or be removed by distillation.

Examples of such reaction mixtures are reaction products of tetraethoxysilane or hexaethoxydisiloxane or ethoxyoligosiloxane containing approximately 40 wt % of $SiO_2$ or tetra-n-propoxysilane or tetra-n-butoxysilane with di-n-butyltin diacetate or di-n-octyltin diacetate or di-n-butyltin dilaurate or di-n-octyltin dilaurate.

Preference is given to reaction products of tetraethoxysilane with di-n-butyltin diacetate, of hexaethoxydisiloxane with di-n-butyltin diacetate, of tetra-n-propoxysilane with di-n-butyltin diacetate, of tetra-n-butoxysilane with di-n-butyltin diacetate, of tetraethoxysilane with di-n-butyltin dicaprylate, of tetraethoxysilane with di-n-butyltin dilaurate, of hexaethoxydisiloxane with di-n-butyltin dilaurate, of tetra-n-propoxysilane with di-n-butyltin dilaurate, and of tetraethoxysilane with di-n-octyltin diacetate.

The silanes listed under (A) (c) (i), or partially hydrolyzed products, listed under (A) (c) (ii), of silanes are used, to prepare the reaction mixtures lister under (kk), in amounts of 0.5–10 parts by weight, preferably 2–6 parts by weight per part by weight of the organotin compound listed under (A) (c) (k).

The organotin compounds, mentioned as catalysts under (A) (c) (k), of the formula $R'_2Sn(OCOR'')_2$ and the reaction mixtures, listed under (A) (c) (kk), of organotin compounds lister under (A) (c) (k) with silanes listed under (A) (c) (i) or with partially hydrolyzed products, listed under (A) (c) (ii), of silanes may be used individually or as mixtures with one another, specifically in a quantitative proportion of 0.2–2 wt %, preferably 0.3–1.4 wt %.

The constituents polymer, crosslinker and catalyst present for any condensation-crosslinking RTV-2 rubber composition are, optionally, accompanied by further additives, to ensure proper performance of the product to the technologically required extent, e.g. fillers, plasticizer, pot life regulators, water and optionally further additives.

The optional filler can be,
d) fillers with or without surface treatment,
  (l) reinforcing fillers.

Examples of the reinforcing fillers mentioned under (A) (d) (l) are fumed silica, i.e. silica prepared in a flame, or precipitated silica or fumed titanium dioxide having BET area of 50–300 $m^2/g$.

Since these reinforcing fillers markedly enhance the viscosity of the rubber composition and, moreover, when the compositions are stored result in pseudo crosslinking via H bonds, it is necessary to hydrophobicize their surface in order to prepare pourable products. It is possible to use organosilicon compounds such as chlorosilanes, diorganopolysiloxanes, diorganocyclopolysiloxanes, diorganocyclopolysilazanes or alkyldisilazanes.

The treatment of the filler surface may take place i.e. by adding the hydrophobicizing agent to the mixture of polymer and filler, or in a separate step, so that the previously hydrophobicized filler is added to the polymer.

For purposes of the products according to the invention, preference is given to the use of fumed silica having BET areas of 90–170 $m^2/g$, which has been hydrophobicized with hexamethyldisilazane.

Other fillers that can be used are
  (ll) non-reinforcing fillers.

The non-reinforcing fillers mentioned under (A) (d) (ll) have particle sized of between 0.05 $\mu$m and 300 $\mu$m, preferably of between 0.1 $\mu$m and 50 $\mu$m (for fibrous fillers between 50 $\mu$m and 200 $\mu$m).

Examples of the non-reinforcing fillers mentioned under (A) (d) (ll) are quartz powder, christobalite powder, diatomaceous earth, mica, aluminum silicates, magnesium aluminum silicates, zirconium silicates, calcium carbonates (including coated grades), iron oxides, titanium oxides, aluminum oxides, zirconium oxides, gypsum annaline, barium sulfate, boron carbide, boron nitride, graphite, carbon fibers, glass fibers or hollow glass spheres, whose surface may have been treated with the hydrophobicizing organosilicon compounds mentioned under (A) (d) (l).

The fillers mentioned under (A) (d) (l) and (A) (d) (ll) may be used either individually and in combination with one another and/or among one another, type and quantity of the fillers used depending on whether the preparations desired are to be pourable, spreadable, spreadable non-sag (i.e. not running or sagging, from a vertical surface, in a coating thickness of up to several centimeters) or kneadable. Reinforcing fillers are used if vulcanized materials with high tear resistance and tear propagation resistance are being aimed for, the proportion of this category of fillers being limited, in the case of casting compositions, to at most 25 wt %, owing to their strongly viscosity-enhancing effect.

The total quantitative proportion of the fillers mentioned under (A) (d) (l) and (A) (d) (ll) is 1–80 wt %, preferably 5–50 wt %.

Other additives which can be used are,
e) plasticizers
  (m) preferably chain-like polydiorganosiloxanes of the formula

when
  n >2, preferably 5–200, more preferably 30–150,
  R has the abovementioned meaning,
  X is a triorganosiloxy radical, preferably trimethylsiloxy, vinyldimethylsiloxy or phenyldimethylsiloxy radical, and
  Y is a triorganosilyl radical, preferably trimethylsilyl, vinyldimethylsilyl or phenyldimethylsilyl radical, but may also be H, with a viscosity of 5–1000 mPa.s at 23° C., preferably 35–350 mPa.s at 23° C., in a quantitative proportion of 1–60 wt %, preferably 3–30 wt %.

Y may also be H, i.e. said polydiorganosiloxanes may, at one chain end, carry one of the triorganosiloxy substituents listed, but at the other chain end, in part or throughout, carry an SiOH function. Via this group, which is reactive in the condensation-crosslinking system, they may be unilaterally crosslinked into said system and therefore show no tendency to exude from the vulcanized material; moreover, particularly in the case of low chain lengths, they represent a combination of a plasticizer and a pot life regulator as is mentioned under (A) (f).

The plasticizer mentioned under (A) (e) are used both to reduce the hardness of the vulcanized material and, in the case of casting compositions, to reduce the viscosity and thus to increase the pourability. The amount in which they are used is limited by their negative effect on the tear resistance and tear propagation resistance of the vulcanized material.

The plasticizers mentioned under (A) (e) have a viscosity of 5–1000 mPa.s at 23° C., preferably 35–350 mPa.s at 23° C., and are used in a quantitative proportion of 1–60 wt %, preferably 3–30 wt %.

Another optional component can be
f) pot life regulators, comprising α,ω-dihydroxypolydiorganosiloxanes of the formula

wherein n >8 and <220, and

R has the above mentioned meaning, with a viscosity of 10–1000 mPa.s at 23° C., preferably 20–500 mPa.s at 23° C., in a quantitative proportion of 0.1–10 wt %, preferably 0.2–3 wt %.

Owing to their relatively low chain length, they have relatively high SiOH contents of between 0.22 and 5 wt %, preferably 0.28–4 wt %.

Another example of an optional component is, g) water in bulk, or as part of an emulsion or as part of a filler preparation, in a quantitative proportion of 0.005–1 wt %, preferably 0.02–0.2 wt %.

The organotin catalysts listed under (A) (c) are first, by hydrolysis, converted into the catalytically active species. The hydrolysis may be carried out via the humidity present in the ambient air, said humidity diffusing into the silicone rubber owing to the latter's high permeability to water vapor. With layer thicknesses of >1 cm, this diffusion process takes to long to be able to ensure uniform, rapid full vulcanization. Frequently, the constituents (A) (a), (A) (d) (ll), (A) (e) and (A) (f), which are used in the rubber composition, contain enough water. If that is not the case, water or, in order to achieve a more homogeneous distribution in the rubber, a water/polydiorganosiloxane emulsion or a water/filler preparation is used, the quantitative proportion, based on water, being between, 0.005 and 1 wt %, preferably 0.02–0.2 wt. %.

Other optional additives used in RTV compositions can be present and for purposes of the present information are defined as, h) further additives In individual cases, further additives can be used, e.g. soluble and insoluble pigments, odorants, antistatics, consistency regulators such as, e.g., thixotropic additives, "internal" release agents (e.g. high-molecular weight polydiorganosiloxanes having an exudation tendency, or organic oils, fats or waxes), organic plasticizers which are compatible with silicon polymers, i.e. will not exude (e.g. alkyl phthalates, linear and branched alkyl aromatics having $C_{12}$–$C_{18}$ side chains or polyisobutylenes) etc.

The composition of the condensation-crosslinking, room-temperature vulcanizing rubber compound is not, however, crucial for the efficacy of the additives (B) according to the invention, i.e. the latter always provide the advantage according to the invention with respect to the rubber composition which does not contain the additives (B), the composition otherwise being identical.

According to the invention (B) as additives are selected from the group consisting of (x) sterically hindered phenols, bisphenols or thiobisphenols (y) zinc dialkyl dithiophosphates or zinc diaryl dithiophosphates of the formula $$Zn[S\text{—}P(S)\text{—}(OR^3)_2]_2$$

in which $R^3$ is a univalent hydrocarbon radical having 1–14 carbon atoms, preferably methyl, ethyl, n-propyl, n-butyl, n-pentyl, n-hexyl, 2-ethylhexyl, n-octyl, phenyl, tolyl, and (z) aromatic or sterically hindered amines.

Examples of (x) are, 2,6-di-t-butylphenol, 2,6-di-t-butyl-4-methylphenol, octadecyl 3,5-di-t-butyl-4-hydroxyhydrocinnamate, 4,4'-methylene-bis(2,6-di-t-butylphenol, 2,2'-methylene-bis(4-methyl-6-t-butylphenol, monomethacrylate esters of 2,2'-methylene-bis(4-methyl-6-t-butylphenol, 1,3,5-trimethyl-2,4,6-tris(3,5-di-t-butyl-4-hydroxybenzyl)benzene and 4,4'-thio-bis(4,6-di-t-butylphenol).

Preferred compounds are the sterically hindered phenols 2,6-di-t-butylphenol and 2,6-di-t-butyl-4-methylphenol, and the sterically hindered bisphenols 4,4'-methylene-bis(2,6-di-t-butylphenol) and 2,2'-methylene-bis(4-methyl-6-t-butylphenol).

The sterically hindered phenols, bisphenols or thiobisphenols mentioned under (B) are added in a quantitative proportion of 0.005–0.3 wt %, preferably 0.01–0.1 wt %.

Preferred compounds (y) are zinc di-n-hexyl dithiophosphate, zinc di-2-ethylhexyl dithiophosphate and zinc diphenyl dithiophosphate.

The zinc dialkyl dithiophosphates and zinc diaryl dithiophosphates mentioned under (B) (I) (y) are added in a quantitative proportion of 0.005–0.3 wt %, or preferably 0.02–0.2 wt %.

Examples of the (z) group of substances are N-phenylbenzylamine, N-phenyl-1-naphthylamine, 4,4'-di(α,α'-dimethylbenzyl)diphenylamine, 4,4'-di(2,4,4-trimethylpentyl)diphenylamine, N,N'-diphenyl-1,4-phenylenediamine, N-phenyl-N'-(1,3-dimethylbutyl)-1,4-phenylenediamine and (4-anilinophenyl) methacrylate or bis(1,2,2,6,6-pentamethyl-4-piperidinyl) sebacate and bis(2, 2,6,6-tetramethyl-4-piperidinyl) sebacate.

Preferred compounds are N-phenylbenzylamine and N-phenyl-1-naphthylamine.

The aromatic or sterically hindered amines mentioned under (B) (I) (z) are used in a quantitative proportion of 0.001–0.1 wt %, preferably 0.005–0.05 wt %.

Component B can also be

II) preparations which contain the substances listed under (I) (x–z) either individually or in combination in the quantities according to the invention.

Efficacy in the sense of the present invention is shown not only by the individual groups of substances mentioned under (B) (I), but equally by those preparations listed under (B) (II) containing such substances mentioned under (B) (I) individually or in combination in the quantities according to the invention, such as, e.g., conventional additives for polymers, plastics and lubricants.

The additives of component (B) may be present individually or in combination.

The additives according to the invention may be used either in bulk or, owing to more effective metering, in carriers with which they form homogeneous mixtures. Preferred such carriers are silicone oils and organic oils, owing to their good compatibility with the RTV-2 silicone rubber.

In some cases, the additives (B) according to the invention are prepared directly in the carriers and are commercially available only as mixtures with the carriers.

The additives (B), substances and preparations according to the invention are described, in Ullmann, Encyclopedia of Industrial Chemistry, Verlag Chemie, Weinheim, 5th edition 1985, under "antioxidants", item 4 "Practices in Stabilization with Antioxidants", vol A3, pp. 104 ff.; W. J. Bartz, Additive für Schmierstoffe [Lubricant additives], volume 2, Vincentz-Verlag, Hanover, 1984.

Although the use of such substances like the additives (B) according to the invention as antioxidants in addition-crosslinking organosiloxane preparations is already known, this applies exclusively to thermal stabilization of these preparations and of the moldings produced therefrom (Burnier, U.S. Pat. No. 5,118,735) and to the oxidative stabilization of a non-silicone constituent, namely paraffin wax, during storage (Yoshino et al., U.S. Pat. No. 5,879, 339).

Surprisingly, this group of active ingredients also gives rise to a distinct increase in the resistance of molds, made from condensation-crosslinking, room-temperature vulcanizing silicone rubbers, to organic casing resins, in particular unsaturated polyester resins and polyurethane resins and thus permits an increase in the number of castings, i.e. of the casting resin molding which can be achieved from a mold, by 50% on average, and an increase in the service life of the molds.

The invention further relates to a method of preparing condensation-crosslinking, room-temperature vulcanizing silicone rubber compositions which comprises mixing the constituents A (a–c) and optionally (d–h) and B.

The compositions according to the invention may be prepared by blending the various constituents with the aid of suitable devices such as, e.g., planetary mixers, planetary dissolvers or kneaders, advantageously the polymers (A) (a) and optionally the fillers (A) (d) first being blended with one another in as stiff a phase as possible. This can be done at room temperature, but preferably at temperatures above 70° C. If required, this base blend is then, at temperatures below 40°, but preferably at room temperature, admixed and blended with the other constituents listed under (A) and (B).

Since, however, the vulcanization reaction starts immediately once crosslinkers as listed under (A) (b) and catalysts as listed under (A) (c) have been added, and the compositions therefore have to be processed at once within the particular pot life, i.e. there is not storage stability, the constituents of the mixture are usually divided in such a way between two components that the latter have adequate storage stability of a number of months, preferably a number of years, but after mixing immediately produce the desired crosslinking reaction even at room temperature.

Thus it is possible, for example, to combine the mixture constituents (A) (a), (A) (b), (A) (d), (A) (e), (A) (f), (A) (g), (A) (h) and (B) into one component, the rubber composition, and to use the catalyst (A) (c) as the second component.

It is also possible, for example, to combine the mixture constituents (A) (a), (A) (d), (A) (e), (A) (f), (A) (g), and (A) (h) as the rubber composition, and (A) (b), (A) (c), possibly an aliquot of (A) (e) and (B) as the curing agent, the latter option being preferred.

When the preparations according to the invention are to be used, the two components are then blended homogeneously with one another by stirring, kneading or rolling.

Depending on their composition, the consistency of the two components may be pourable, spreadable, spreadable non-sag (i.e. not running or sagging, from vertical surfaces, with a coating thickness of up to several centimeters) or kneadable, a viscosity range for pourable components, of between 1 mm$^2$/s at 23° C. and 200000 mPa.s at 23° C. being preferred.

Depending on their composition, the compositions according to the invention after blending of the two components may have processing times or pot lives of from 30 seconds to 8 hours, preferably, however, of from 2 minutes to 3 hours, the term processing time referring to the period within which the rubber composition has a consistency suitable for the particular processing operation.

Thus a casting composition should not, with a view to good pourability and deaeration, which is to be understood as the escape of the air in the form of bubbles which has inevitably been stirred in during blending of the two components, within the processing time exceed a viscosity of 150000 mPa.s at 23° C., preferably 100000 mPa.s at 23° C.

The invention further relates to the use of the condensation-crosslinking, room-temperature vulcanizing silicone rubber compositions, for making molds.

The preparations according to the invention are used to make flexible molds such as e.g. female molds, but are in principle suitable for any applications for which condensation-crosslinking RTV-2 silicone rubbers (i.e. compositions crosslinking at room temperature and comprising 2 components) can be used, i.e. for potting or embedding electric or electronic components, bonding and coating of different materials, production of silicone rubber moldings and seals etc.

The invention further relates to female molds made of condensation-crosslinking, room-temperature vulcanizing silicone rubber compositions.

The flexible female molds made from the preparations according to the invention serve for the reproduction of any originals or models in all standard reproduction materials such as, e.g., plaster, concrete, artificial stone, wax, low-melting metal alloys, organic casting resins and casting resin foams such as unsaturated polyester resins, polyurethane resins, epoxy resins and, subject to certain restrictions, methyl methacrylate resins and also thermoplastics such as polyethylene, polypropylene, polyamides, polystyrene, poly (vinylchloride) etc.

Preference within the scope of the present invention is given to unsaturated polyester resins and polyurethane resins.

Molds which have been made from the preparations according to the invention have distinctly higher resistance, compared with molds made from comparable RTV-2 silicone rubbers which do not contain the additives (B) according to the invention, to the aggressive constituents contained in the unsaturated polyester and polyurethane resins and thus permit reproduction numbers which are higher by at least 50%, i.e. per mold it is possible to produce, on average, 50% more casting resin moldings before adhesion of the resin castings or parts of the rubber mold being pulled or torn off causes the mold to fail.

The purpose of the following examples is to illustrate the invention. All parts and percentages are by weight, unless stated otherwise.

COMPARATIVE EXAMPLE 1a 4000 g of an α,ω-bis(trimethylsiloxy)polydimethylsiloxane having a viscosity of 100 mm$^2$/s at 23° C., and 4000 g of a fumed silicic acid hydrophobicized with hexamethyldisilazane and having a BET area of approximately 150 m$^2$/g were blended in a kneader and then kneaded for 2 hours at 130° C.

This was then admixed with 2500 g of an α,ω-dihydroxypolydimethylsiloxane having a viscosity of 6000 mPa.s at 23° C. and 500 g of an α,ω-dihydroxypolydimethylsiloxane having a viscosity of 20000 mPa.s at 23° C.

4500 g of this base were thoroughly blended, in a planetary mixer, with 2500 g of quartz powder having an average particle size of 5 μm, 1500 g of an α,ω-dihydroxypolydimethylsiloxane having a viscosity of 20000 mPa.s at 23° C., 1500 g of an α,ω-bis(trimethylsiloxy)polydimethylsiloxane having a viscosity of 35 mm$^2$/s at 23° C., 200 g of a preparation from 100 g of precipitated titanium dioxide and 100 g of an α,ω-bis(trimethylsiloxy)polydimethylsiloxane having a viscosity of 100 mm$^2$/s at 23° C., 50 g of an α,ω-dihydroxypolydimethylsiloxane having a viscosity of 40 mm$^2$/s at 23° C. and 5 g of a water/α,ω-bis(trimethylsiloxy)polydimethylsiloxane emulsion containing a water fraction of 65%. The resulting rubber composition had a viscosity of 27000 mPa.s at 23° C.

500 g of this rubber composition were blended homogeneously, by means of a mechanical agitator, with 25 g of a curing agent mix comprising 6 g of tetraethoxysilane, 2 g of dibutyltin dilaurate and 17 g of an α,ω-bis (trimethylsiloxy)polydimethylsiloxane having a viscosity of 35 mm$^2$/s at 23° C.

The catalyzed blend having a viscosity of approximately 23000 mPa.s and a processing time of 30 min at 23° C. was freed of the air which had been blended in, at a reduced pressure of 15 mbar. After 5 h the test molds made therefrom had fully vulcanized so as to be tack-free and could be take off the model.

The vulcanized material had a Shore A hardness of 26 and a tear resistance, according to ASTM 624 B, of 21 N/mm.

The model used was a bell-shaped plaster body having a height of 10 cm, a mean diameter of 7 cm and a volume of approximately 500 cm$^3$, whose surface contained indentations of various dimensions and structure, which were formed in such a way that the surface of the rubber mold obtained therefrom had a number of filigreed edges, conical tips and tightundercuts. Since these raised structures had casting resin flowing around them virtually on all sides, swelling or chemical attack by the aggressive casting resin constituents was inevitably going to be extremely pronounced.

The test molds were made in a casting process as single-piece skin molds with two-piece support molds made of plaster. 20 hours after demolding from the model they were charged with casting resin for the first time. The molds were charged twice a day, each time with approximately 450 cm$^3$ of casting resin. The resin castings each time remained in the mold for 2 hours to achieve a full cure. Demolding of the resin castings was performed by turning the skin mold inside out, so as to subject the mold to maximum mechanical stress. Overnight and over the weekends the molds were stored in an open state at room temperature.

The casting resins selected were unfilled types having a high reaction heat, so that in conjunction with the relatively large volume of the castings a high reaction temperature prevailed during the full cure of the castings, entailing maximum attack to the mold surface.

The unsaturated polyester resin used was PALATAL P4 (manufactured by BASF) without filler, with a viscosity of 650 mPa.s and a styrene fraction of 35%. Processing involved 1% of curing agent Butanox M 50 (2-butanone peroxide in dimethyl phthalate) and 0.25% of accelerator cobalt naphthenate, which resulted in a maximum reaction temperature of about 150° C., a processing time of about 15 min and a cure time until the material was tack-free of about 1.5 hours.

The polyurethane resin used was UREOL 6426 A/B (manufactured by CIBA-GEIGY) without fillers, with a viscosity of 600 mPa.s at 23° C. It was processed by the components A and B being mixed in proportions by weight of 1:1, which resulted in a maximum reaction temperature of about 90° C., a processing time of about 7 min and a cure time until the material was tack-free of about 45 min.

The assessment criterion for determining the reproduction frequency was the satisfactory reproduction of the model structures, i.e. it was not acceptable for filigreed mold sections to have been torn off or portions to have been torn out from the mold surface or for tears in the skin mold itself to have occurred. The value adopted for the service life was the number of resin castings up to which no damage whatsoever to the mold or the casting could be observed.

The number of reproductions which were achieved with the molds made from the composition of Comparative Example 1a and with the two casting resins, are given in Table 1.

COMPARATIVE EXAMPLE 1b

The procedure described in Comparative Example 1a was repeated, except that the curing agent mix comprised 6 g of tetraethoxysilane, 2 g of di-n-octyltin dimaleate and 17 g of an α,ω-bis(trimethylsiloxy)polydimethylsiloxane with a viscosity of 35 mm$^2$/s at 23° C.

The catalyzed mixture had a viscosity of about 23000 mPa.s and a processing time of 20 min at 23° C. After 4 h the test molds made therefrom had fully vulcanized so as to be tack-free and could be taken off the model.

The vulcanized material had a Shore A hardness of 27 and a tear propagation resistance according to ASTM 624 B of 18 N/mm.

The number of reproductions which were achieved with the molds made from the composition of Comparative Example 1b and with the two casting resins, are given in Table 1.

COMPARATIVE EXAMPLE 1c

The procedure described in Comparative Example 1a was repeated, except that the curing agent mix comprised 4.1 g of tetra-n-propoxysilane, 3.4 g of a reaction product of 4 parts of tetra-n-propoxysilane with 1 part of di-n-butyltin diacetate and 17.5 g of an α,ω-bis(trimethylsiloxy) polydimethylsiloxane with a viscosity of 35 mm$^2$/s at 23° C.

The catalyzed mixture had a viscosity of about 24000 mPa.s and a processing time of 85 min at 23° C. After 12 h the test molds made therefrom had fully vulcanized so as to be tack-free and could be taken off the model.

The vulcanized material had a Shore A hardness of 21 and a tear resistance according to ASTM 624 B of 20 N/mm.

The number of reproductions which were achieved with the molds made from the composition of Comparative Example 1c and with the two casting resins, are given in Table 1.

COMPARATIVE EXAMPLE 1d

The procedure described in Comparative Example 1a was repeated, except that the curing agent mix comprised 4.1 g of tetra-n-propoxysilane, 3.4 g of a reaction of 4 parts of tetra-n-propoxysilane with 1 part of di-n-butyltin diacetate and 17.5 g of white mineral oil.

The catalyzed mixture had a viscosity of about 24000 mPa.s and a processing time of 75 min at 23° C. After 10 h the test molds made therefrom had fully vulcanized so as to be tack-free and could be taken off the model.

The vulcanized material had a Shore A hardness of 19 and a tear propagation resistance according to ASTM 624 B of 22 N/mm.

The number of reproductions which were achieved with the molds made from the composition of Comparative Example 1d and with the two casting resins, are given in Table 1.

EXAMPLE 1a

The procedure described in Comparative Example 1a was repeated, except that the curing agent mix comprised 6 g of tetraethoxysilane, 2 g of dibutyltin dilaurate, 0.3 g of a preparation comprising 85 parts of zinc di-2-ethylhexyl dithiophosphate and 15 parts of an α,ω-bis(trimethylsiloxy) polydimethylsiloxane with a viscosity of 100 mm$^2$/s at 23° C. and 16.7 g of an α,ω-bis(trimethylsiloxy) polydimethylsiloxane with a viscosity of 35 mm$^2$/s at 23° C.

The catalyzed mixture had a viscosity of about 24000 mPa.s and a processing time of 40 min at 23° C. After 6 h the test molds made therefrom had fully vulcanized so as to be tack-free and could be taken off the model.

The vulcanized material had a Shore A hardness of 25 and a tear propagation resistance according to ASTM 624 B of 20 N/mm.

The number of reproductions which were achieved with the molds made from the composition of Example 1a and with the two casting resins, are given in Table 1.

EXAMPLE 1b

The procedure described in Comparative Example 1a was repeated, except that the curing agent mix comprised 6 g of tetraethoxysilane, 2 g of di-n-octyltin dimaleate, 0.3 g of a preparation comprising 85 parts of zinc di-2-ethylhexyl dithiophosphate and 15 parts of white mineral oil and 16.7 of an $\alpha,\omega$-bis(trimethylsiloxy)polydimethylsiloxane with a viscosity of 35 mm$^2$/s at 23° C.

The catalyzed mixture had a viscosity of about 24000 mPa.s and a processing time of 30 min at 23° C. After 5 h the test molds made therefrom had fully vulcanized so as to be tack-free and could be taken off the model.

The vulcanized material had a Shore A hardness of 26 and a tear propagation resistance according to ASTM 624 B of 17 N/mm.

The number of reproductions which were achieved with the molds made from the composition of Example 1b and with the two casting resins, are given in Table 1.

EXAMPLE 1c

The procedure described in Comparative Example 1a was repeated, except that the curing agent mix comprised 4.1 g of tetra-n-propoxysilane, 3.4 g of a reaction product of 4 parts of tetra-n-propoxysilane with 1 part of di-n-butyltin diacetate, 0.3 g of a preparation comprising 85 parts of zinc di-2-ethylhexyl dithiophosphate and 15 parts of white mineral oil and 17.2 g of an $\alpha,\omega$-bis(trimethylsiloxy) polydimethylsiloxane with a viscosity of 35 mm$^2$/s at 23° C.

The catalyzed mixture had a viscosity of about 24000 mPa.s and a processing time of 90 min at 23° C. After 14 h the test molds made therefrom had fully vulcanized so as to be tack-free and could be taken off the model.

The vulcanized material had a Shore A hardness of 20 and a tear propagation resistance according to ASTM 624 B of 19 N/mm.

The number of reproductions which were achieved with the molds made from the composition of Example 1c and with the two casting resins, are given in Table 1.

EXAMPLE 1d

The procedure described in Comparative Example 1a was repeated, except that the curing agent mix comprised 4.1 g of tetra-n-propoxysilane, 3.4 g of a reaction product of 4 parts of tetra-n-propoxysilane with 1 part of di-n-butyltin diacetate, 0.6 g of a preparation comprising 85 parts of zinc di-2-ethylhexyl dithiophosphate and 15 parts of white mineral oil and 16.9 g of an $\alpha,\omega$-bis(trimethylsiloxy) polydimethylsiloxane with a viscosity of 35 mm$^2$/s at 23° C.

The catalyzed mixture had a viscosity of about 24000 mPa.s and a processing time of 100 min at 23° C. After 16 h the test molds made therefrom had fully vulcanized so as to be tack-free and could be taken off the model.

The vulcanized material had a Shore A hardness of 20 and a tear propagation resistance according to ASTM 624 B of 18 N/mm.

The number of reproductions which were achieved with the molds made from the composition of Example 1d and with the two casting resins, are given in Table 1.

EXAMPLE 1e

The procedure described in Comparative Example 1a was repeated, except that the curing agent mix comprised 4.1 g of tetra-n-propoxysilane, 3.4 g of a reaction product of 4 parts of tetra-n-propoxysilane with 1 part of di-n-butyltin diacetate, 0.1 g of a preparation comprising 85 parts of zinc di-2-ethylhexyl dithiophosphate and 15 parts of white mineral oil, and 17.4 g of an $\alpha,\omega$-bis(trimethylsiloxy) polydimethylsiloxane with a viscosity of 35 mm$^2$/s at 23° C.

The catalyzed mixture had a viscosity of about 24000 mPa.s and a processing time of 100 min at 23° C. After 16 h the test molds made therefrom had fully vulcanized so as to be tack-free and could be taken off the model.

The vulcanized material had a Shore A hardness of 20 and a tear propagation resistance according to ASTM 624 B of 19 N/mm.

The number of reproductions which were achieved with the molds made from the composition of Example 1e and with the two casting resins, are given in Table 1.

EXAMPLE 1f

The procedure described in Comparative Example 1a was repeated, except that the curing agent mix comprised 4.1 g of tetra-n-propoxysilane, 3.4 g of a reaction product of 4 parts of tetra-n-propoxysilane with 1 part of di-n-butyltin diacetate, 0.3 g of a preparation comprising 85 parts of zinc di-2-ethylhexyl dithiophosphate and 15 parts of white mineral oil, and 17.2 g of white mineral oil.

The catalyzed mixture had a viscosity of about 24000 mPa.s and a processing time of 85 min at 23° C. After 14 h the test molds made therefrom had fully vulcanized so as to be tack-free and could be taken off the model.

The vulcanized material had a Shore A hardness of 20 and a tear propagation resistance according to ASTM 624 B of 19 N/mm.

The number of reproductions which were achieved with the molds made from the composition of Example 1f and with the two casting resins, are given in Table 1.

EXAMPLE 1g

The procedure described in Comparative Example 1a was repeated, except that the curing agent mix comprised 4.1 g of tetra-n-propoxysilane, 3.4 g of a reaction product of 4 parts of tetra-n-propoxysilane with 1 part of di-n-butyltin diacetate, 0.2 g of a preparation comprising 45 parts of 2,6-di-t-butylphenol, 0.5 parts of N-phenylbenzylamine and 54.5 parts of white mineral oil and 17.2 g of an $\alpha,\omega$-bis (trimethylsiloxy)polydimethylsiloxane with a viscosity of 35 mm$^2$/s at 23° C.

The catalyzed mixture had a viscosity of about 24000 mPa.s and a processing time of 110 min at 23° C. After 16 h the test molds made therefrom had fully vulcanized so as to be tack-free and could be taken off the model.

The vulcanized material had a Shore A hardness of 20 and a tear propagation resistance according to ASTM 624 B of 21 N/mm.

The number of reproductions which were achieved with the molds made from the composition of Example 1g and with the two casting resins, are given in Table 1.

EXAMPLE 1h

The procedure described in Comparative Example 1a was repeated, except that the curing agent mix comprised 4.1 g of tetra-n-propoxysilane, 3.4 g of a reaction product of 4 parts of tetra-n-propoxysilane with 1 part of di-n-butyltin diacetate, 0.3 g of a preparation from 85 parts of zinc di-2-ethylhexyl dithiophosphate and 15 parts of white mineral oil, 0.2 g of a preparation comprising 45 parts of 2,6-di-t-butylphenol, 0.5 parts of N-phenylbenzylamine and 54.5 parts of white mineral oil and 17 g of an α,ω-bis(trimethylsiloxy)polydimethylsiloxane with a viscosity of 35 mm$^2$/s at 23° C.

The catalyzed mixture had a viscosity of about 24000 mPa.s and a processing time of 140 min at 23° C. After 24 h the test molds made therefrom had fully vulcanized so as to be tack-free and could be taken off the model.

The vulcanized material had a Shore A hardness of 20 and a tear propagation resistance according to ASTM 624 B of 20 N/mm.

The number of reproductions which were achieved with the molds made from the composition of Example 1h and with the two casting resins, are given in Table 1.

EXAMPLE 1i

The procedure described in Comparative Example 1a was repeated, except that the curing agent mix comprised 4.1 g of tetra-n-propoxysilane, 3.4 g of a reaction product of 4 parts of tetra-n-propoxysilane with 1 part of di-n-butyltin diacetate, 0.35 g of a preparation comprising 75 parts of zinc diphenyl dithiophosphate and 25 parts of white mineral oil and 17.2 g of an α,ω-bis(trimethylsiloxy)polydimethylsiloxane with a viscosity of 35 mm$^2$/s at 23° C.

The catalyzed mixture had a viscosity of about 24000 mPa.s and a processing time of 110 min at 23° C. After 16 h the test molds made therefrom had fully vulcanized so as to be tack-free and could be taken off the model.

The vulcanized material had a Shore A hardness of 20 and a tear propagation resistance according to ASTM 624 B of 19 N/mm.

The number of reproductions which were achieved with the molds made from the composition of Example 1i and with the two casting resins, are given in Table 1.

As the data of Table 1 demonstrate, the reproduction numbers obtained by means of the silicon rubber preparations of Example 1, which contain the additives according to the invention, are distinctly higher, on average by 50%, with respect to both types of casting resin. Neither the type of the organotin catalyst nor that of the extender in the curing agent component (the purpose of the extender being to achieve the dosage, preferred by manufacturers, of 5 wt % of curing agent component) has a significant effect on this. The maximum number of castings for both casting resins is obtained with additive A (Example 1c). Doubling the amount of additive A added does not result in a further improvement, as example 1d demonstrates. However, if the amount added is reduced, by 60% (Example 1e), the achievable reproduction number decrease significantly. The additives B and C prove slightly less effective than additive A, nor does the combination of additives A and B provide an improvement compared with additive A being used on its own (Example 1h). The fact that the addition of a white mineral oil, i.e. an additive-free mineral oil preparation on its own, in other words without the additives according to the invention, by no means results in increased reproduction numbers is demonstrated by Example 1d.

TABLE 1

|  | Additive 1) | Proportion of additive in overall blend [wt %] | Organotin catalyst 2) | Tin content in overall blend [wt %] | Extender in the curing agent component 3) | Number of castings UP4) | Number of castings PUR5) |
|---|---|---|---|---|---|---|---|
| Comparative Example |  |  |  |  |  |  |  |
| 1a | — | — | a | 0.07 | X | 13 | 16 |
| 1b | — | — | b | 0.05 | X | 13 | 15 |
| 1c | — | — | c | 0.05 | X | 14 | 15 |
| 1d | — | — | c | 0.05 | Y | 14 | 15 |
| Example |  |  |  |  |  |  |  |
| 1a | A | 0.05 | a | 0.07 | X | 21 | 24 |
| 1b | A | 0.05 | b | 0.05 | X | 21 | 23 |
| 1c | A | 0.05 | c | 0.05 | X | 23 | 24 |
| 1d | A | 0.1 | c | 0.05 | X | 23 | 24 |
| 1e | A | 0.02 | c | 0.05 | X | 17 | 18 |
| 1f | A | 0.05 | c | 0.05 | Y | 21 | 22 |
| 1g | B | 0.02 | c | 0.05 | X | 20 | 22 |
| 1h | A + B | 0.05 + 0.02 | c | 0.05 | X | 22 | 23 |
| 1i | C | 0.05 | c | 0.05 | X | 17 | 18 |

1) A Zinc di-2-ethylhexyl dithiophosphate B 2,6-di-t-butylphenol + N-phenylbenzylamine C Zinc diphenyl dithiophosphate
2) a Di-n-butyltin dialaurate b Di-n-butyltin dimaleate c Reaction product from 4 parts of tetra-n-propoxysilane and 1 part of di-n-butyltin diacetate (the n-propyl acetate formed in the process was removed)
3) X α,ω-bis(bimethylsiloxy)polydimethylsiloxane with a viscosity of 35 mm$^2$/s at 23° C. Y mineral oil without additives (white oil)
4) Number of castings from the unsaturated polyester casting resin PALATAL P 4 until the silicone rubber mold became damaged
5) Number of castings from the polyurethane casting resin UREOL 6426 A/B until the silicone rubber mold became damaged

COMPARATIVE EXAMPLE 2

2000 g of an α,ω-dihydroxypolydimethylsiloxane having a viscosity of 20000 mPa.s at 23° C., 1000 g of a α,ω-bis(trimethylsiloxy)polydimethylsiloxane having a viscosity of 100 mm²/s at 23° C., and 2300 g of a fumed silicic acid having a BET area of approximately 130 m²/g, 360 g of hexamethyldisilazane and 130 g of water were blended in a kneader under a nitrogen atmosphere and then kneaded for 1 hours at room temperature and 5 hours at 130° C. This was then admixed with 1000 g of an α,ω-dihydroxypolydimethylsiloxane having a viscosity of 80000 mPa.s at 23° C. and 800 g of an α,ω-dihydroxypolydimethylsiloxane having a viscosity of 20000 mPa.s at 23° C.

3700 g of this base blend are thoroughly blended, in a planetary mixer, with 1800 g of quartz powder having an average particle size of 5 μm, 700 g of an α,ω-dihydroxypolydimethylsiloxane having a viscosity of 20000 mPa.s at 23° C., 500 g of an α,ω-dihydroxypolydimethylsiloxane having a viscosity of 6000 mPa.s at 23° C., 2700 g of an α,ω-bis(trimethylsiloxy)polydimethylsiloxane having a viscosity of 35 mm²/s at 23° C., 150 g of preparation from 75 g of precipitated titanium dioxide and 75 g of an α,ω-bis(trimethylsiloxy)polydimethylsiloxane having a viscosity of 100 mm²/s at 23° C., 40 g of an α,ω-dihydroxypolydimethylsiloxane having a viscosity of 40 mm²/s at 23° C. and 15 g of a water/α,ω-bis(trimethylsiloxy)polydimethylsiloxane emulsion containing a water fraction of 65%. The resulting rubber composition had a viscosity of 23000 mPa.s at 23° C.

500 g of this rubber composition were blended homogeneously, by means of a mechanical agitator, with 25 g of a curing agent mix comprising 5 g of tetra-n-propoxysilane, 3.5 g of a reaction product of 4 parts of tetra-n-propoxysilane with 1 part of di-n-butyltin diacetate, 0.2 g of di-n-butyltin di-2-ethylhexoate and 16.3 g of an α,ω-bis(trimethyl-siloxy)polydimethylsiloxane having a viscosity of 35 mm²/s at 23° C.

The catalyzed blend having a viscosity of approximately 20000 mPa.s and a processing time of 50 min at 23° C. was freed of the air which had been blended in, at a reduced pressure of 15 mbar. After 7 h the test molds made therefrom had fully vulcanized so as to be tack-free and could be take off the model.

The vulcanized material had a Shore A hardness of 15 and a tear resistance, according to ASTM 624 B, of 18 N/mm.

The way the test molds were made and the method for determining the number of reproductions corresponded exactly to the procedure described for Comparative Example 1a. However, the number of reproductions was determined only with respect to the unsaturated polyester resin.

The number of reproductions which was achieved with the mold made from the composition of Comparative Example 2 and with the polyester casting resin, is given in Table 2.

EXAMPLE 2a

The procedure described in Comparative Example 2 was repeated, except that the curing agent mix comprised 5 g of tetra-no-propoxysilane, 3.5 g of a reaction product of 4 parts of tetra-n-propoxysilane with 1 part of di-n-butyltin diacetate, 0.2 g of di-n-butyltin di-2-ethylhexoate, 0.3 g of a preparation comprising 85 parts of zinc di-2-ethylhexyl dithiophosphate and 15 parts of white mineral oil and 16 g of an α,ω-bis(trimethylsiloxy)polydimethylsiloxane with a viscosity of 35 mm²/s at 23° C.

The catalyzed mixture had a viscosity of about 20000 mPa.s and a processing time of 60 min at 23° C. After 8 h the test molds made therefrom had fully vulcanized so as to be tack-free and could be taken off the model.

The vulcanized material had a Shore A hardness of 15 and a tear propagation resistance according to ASTM 624 B of 18 N/mm.

The number of reproductions which was achieved with the mold made from the composition of Example 2a and with the polyester casting resin, is given in Table 2.

EXAMPLE 2b

The procedure described in Comparative Example 2 was repeated, except that the rubber composition comprised 3700 g of base blend, 1800 g of quartz powder having an average particle size of 5 μm, 700 g of an α,ω-dihydroxypolydimethylsiloxane having a viscosity of 20000 mPa.s at 23° C., 500 g of an α,ω-dihydroxypolydimethylsiloxane having a viscosity of 6000 mPa.s at 23° C., 2700 g of an α,ω-bis(trimethylsiloxy)polydimethylsiloxane having a viscosity of 35 mm²/s at 23° C., 150 g of a preparation from 75 g of precipitated titanium dioxide and 75 g of an α,ω-bis(trimethylsiloxy)polydimethylsiloxane having a viscosity of 100 mm²/s at 23° C., 5.8 g of a preparation from 85 parts of zinc di-2-ethylhexyl dithiophosphate and 15 parts of white mineral oil, 40 g of an α,ω-dihydroxypolydimethylsiloxane having a viscosity of 40 mm²/s at 23° C. and 15 g of a water/α,ω-bis(trimethylsiloxy)polydimethylsiloxane emulsion containing a water fraction of 65%. The resulting rubber composition had a viscosity of 23000 mPa.s at 23° C.

The catalyzed mixture had a viscosity of about 20000 mPa.s and a processing time of 55 min at 23° C. After 8 h the test molds made therefrom had fully vulcanized so as to be tack-free and could be taken off the model.

The vulcanized material had a Shore A hardness of 15 and a tear resistance according to ASTM 624 B of 18 N/mm.

The number of reproductions which was achieved with the molds made from the composition of Example 2b and with the polyester casting resin, is given in Table 2.

As the data of Table 2 demonstrate, the reproduction numbers achieved with the silicon rubber preparations of Example 2, which contain one of the additives according to the invention, are increased by 100% with respect to the polyester casting resin. It does not matter, in this context, whether the additive according to the invention is a constituent of the rubber composition or of the curing agent mix.

TABLE 2

| | Additive 1) | Proportion of additive in overall blend [wt %] | Organotin catalyst 2) | Tin content in overall blend [wt %] | Extender in the curing agent component 3) | Number of castings UP4) |
|---|---|---|---|---|---|---|
| Comparative Example | | | | | | |
| 2 | — | — | c + d | 0.06 | X | 11 |
| Example | | | | | | |
| 2a | A | 0.05 | c + d | 0.06 | X | 22 |
| 2b | A | 0.05 | c + d | 0.06 | X | 22 |

1) A Zinc di-2-ethylhexyl dithiophosphate
2) c Reaction product from 4 parts of tetra-n-propoxysilane and 1 part of di-n-butyltin diacetate (the n-propyl acetate formed in the process was removed) d Di-n-butyltin di-2-ethylhexoate
3) X α, ω-bis(triethylsiloxy)polydimethylsiloxane with a viscosity of 35 mm$^2$/s at 23° C.
4) Number of castings from the unsaturated polyester casting resin PALATAL P 4 until the silicone rubber mold became damaged

What is claimed is:

1. A condensation-crosslinking room-temperature vulcanizing silicone rubber composition having improved service life when used as a female mold component, said composition comprising:
   A) a condensation-crosslinking, room-temperature vulcanizing silicone rubber component, and
   B) a mold-life extending component comprising one or more zinc diorgano dithiophosphates.

2. The composition of claim 1, wherein said zinc diorgano dithiophosphates correspond to the formula $$Zn[S—P(S)—(OR^3)_2]_2$$

wherein $R^3$ is a univalent hydrocarbon radical having 1–14 carbon atoms.

3. The composition of claim 1, wherein $R^3$ is an aliphatic hydrocarbon or an aryl hydrocarbon.

4. The composition of claim 1, wherein said zinc diorgano dithiophosphate is employed in an amount of 0.005 to 0.3 weight percent based on the total weight of the composition.

5. The composition of claim 1, wherein said zinc diorgano dithiophosphate is employed in an amount of 0.02 to 0.2 weight percent based on the total weight of the composition.

6. The composition of claim 1 wherein said zinc diorgano dithiophosphates are selected from the group consisting of zinc di(n-hexyl) dithiophosphate, zinc di(2-ethylhexyl) dithiophosphate, zinc diphenyl dithiophosphate, and mixtures thereof.

7. The composition of claim 1 further comprising one or more further mold service life increasing additives selected from the group consisting of sterically hindered phenols, sterically hindered bisphenols, sterically hindered thiobisphenols, and sterically hindered aromatic amines.

8. In a method for producing molded articles by curing a curable liquid molding composition in a female mold, the improvement comprising increasing the service life of said female mold by preparing said female mold from the silicone rubber composition of claim 1.

9. In a method for producing molded articles by curing a curable liquid molding composition in a female mold, the improvement comprising increasing the service life of said female mold by preparing said female mold from the silicone rubber composition of claim 2.

10. In a method for producing molded articles by curing a curable liquid molding composition in a female mold, the improvement comprising increasing the service life of said female mold by preparing said female mold from the silicone rubber composition of claim 3.

11. In a method for producing molded articles by curing a curable liquid molding composition in a female mold, the improvement comprising increasing the service life of said female mold by preparing said female mold from the silicone rubber composition of claim 4.

12. In a method for producing molded articles by curing a curable liquid molding composition in a female mold, the improvement comprising increasing the service life of said female mold by preparing said female mold from the silicon rubber composition of claim 5.

13. In a method for producing molded articles by curing a curable liquid molding composition in a female mold, the improvement comprising increasing the service life of said female mold by preparing said female mold from the silicone rubber composition of claim 6.

14. In a method for producing molded articles by curing a curable liquid molding composition in a female mold, the improvement comprising increasing the service life of said female mold by preparing said female mold from the silicone rubber composition of claim 7.

* * * * *